United States Patent Office 3,781,383
Patented Dec. 25, 1973

3,781,383
IMPACT VINYL AROMATIC POLYMERS AND
THEIR PREPARATION
Arnold B. Finestone and Richard C. Westphal, Leominster, and Charles Brac, Jr., Sterling, Mass., assignors to Foster Grant Co., Inc., Leominster, Mass.
No Drawing. Continuation of abandoned application Ser. No. 850,640, Aug. 15, 1969. This application Jan. 24, 1972, Ser. No. 220,526
Int. Cl. C08f 19/08
U.S. Cl. 260—876                                   19 Claims

ABSTRACT OF THE DISCLOSURE

Impact vinyl aromatic polymers having improved surface appearance, good impact and tensile strengths and good flow characteristics are prepared by mass polymerizing, until about 2 to 15% of the monomer has been converted to polymer, at least one monovinyl aromatic compound having dissolved therein at least one 1,3-butadiene rubbery polymer, adding a mercaptan molecular weight modifying agent to the polymerization mixture and completing the polymerization.

BACKGROUND OF THE INVENTION

This is a continuation of application Ser. No. 850,640, filed Aug. 15, 1969.

This invention relates to the preparation of impact vinyl aromatic polymers which have improved surface appearance and toughness properties as well as the usual desirable high flow properties. More particularly, this invention relates to a process which comprises polymerizing at least one vinyl aromatic compound, such as styrene, in the presence of one or more mercaptans and at least one 1,3-butadiene rubbery polymer.

Impact vinyl aromatic polymers are normally solid polymerizates of at least one monovinyl aromatic compound and contain at least one rubbery polymer, present in particulate form. These polymers have achieved general acceptance for many commercial molding operations, however, articles molded from these polymers often do not have a very good surface appearance, apparently partly due to the fact that they contain large particles of rubber and partly because they have poor flow characteristics, which makes it very difficult to mold these polymers into smooth-surfaced objects. This is of little consequence when the molded products are intended for use in places which are hidden from the eye; however, if the polymer is intended for use in applications where the product surface is visible, the usual impact polymers are often unsatisfactory.

Another major disadvantage of impact vinyl aromatic polymers prepared by existing procedures is that they cannot be blended with the corresponding resinous homopolymer for the purpose of producing impact vinyl aromatic polymers having lower rubbery polymer contents without losing some of the toughness of the polymer. For example, an impact polystyrene prepared by direct polymerization has a considerably higher impact strength than an impact polystyrene having the same rubber content but prepared by blending styrene homopolymer with an impact polystyrene having a higher rubber content. It is not definitely understood why this happens, but it can be readily appreciated that this occurrence makes it necessary to polymerize a separate batch of impact vinyl aromatic polymer of each desired rubber content if a product having the greatest toughness is to be obtained.

It is known that the particle size of the rubbery component of impact polystyrene directly influences the physical properties of the polymer, i.e., within certain limits, the smaller the particle size of the rubber the more thoroughly it is dispersed in the polystyrene and the higher the impact strength of the product. It is also known that the surface appearance of products made from impact styrene polymers is improved by decreasing the size of the rubbery particles in the polystyrene matrix.

U.S. Pat. No. 3,311,675, issued to Doak et al., discloses a two-stage bulk polymerization process for preparing impact vinyl aromatic polymers. The novel feature of this invention is the addition of a minor amount of an inert diluent to the polymerization mixture to provide better control of the process and to improve the physical properties of impact vinyl aromatic polymers. The patentees state that chain transfer agents can be used, in addition to the inert diluent, in the preparation of their polymers.

It has now been discovered that the addition of one or more mercaptan molecular weight modifying agents to an impact vinyl aromatic polymerizing mixture during a specific period in the course of the polymerization results in the production of a polymer having not only very good flow properties, but also unexpectedly improved toughness and surface appearance even when the polymer is blended with the corresponding resinous homopolymer to produce impact vinyl aromatic polymers having lower rubber contents. Microscopic examination of polymers prepared according to this invention reveal that the average particle size of the rubbery polymer which is dispersed throughout the resinous polymer is very small, i.e., within the range of about 1–10 microns and usually about 1–5 microns, and that the particle size of the rubber can be regulated by varying the time addition of the mercaptan to the polymerization system. Because of the present invention, impact vinyl aromatic polymers can now be prepared which have excellent surface appearance and toughness as well as the high flow properties required to fabricate them into usable parts by the use of conventional forming machines and techniques. Furthermore, it is now possible to prepare one impact vinyl aromatic polymer having a very high rubber content which can be blended with the corresponding resinous homopolymer to produce impact polymers having any desired lower rubber content with maximum toughness.

Accordingly, it is an object of the present invention to provide impact vinyl aromatic polymers, especially impact styrene polymers, having improved surface appearance and toughness, and excellent flow properties. It is another object to present a process for preparing impact vinyl aromatic polymers having improved surface appearance and toughness and excellent flow properties. It is a further object of the invention to present a method of regulating the particle size of the rubbery component in an impact vinyl aromatic polymer. It is a still further object of the invention to present an impact vinyl aromatic polymer having a high rubber content which can be blended with the corresponding vinyl aromatic homopolymer to reduce the rubber content of the polymer to any given value without sacrificing any of the toughness of the polymer. These and other objects of the invention will become apparent as the description proceeds.

SUMMARY OF THE INVENTION

According to the invention, an impact vinyl aromatic polymerization mixture is prepared by dissolving one or more 1,3-butadiene rubbery polymers in at least one monoalkenyl aromatic monomer. Bulk polymerization of the mixture is then initiated, either thermally, or by the use of a suitable polymerization catalyst. After polymerization has proceeded to a point at which about 2 to about 15% of the monomer is polymerized, a predetermined amount of mercaptan molecular weight modifying agent is added to the mixture and the polymerization is then continued to completion. The polymerization may be completed in bulk or the polymerization mixture may be suspended in an aqueous medium at some point after about 20 to 50% of the monomer present in the mixture has been converted to polymer and the polymerization completed by the suspension method.

DESCRIPTION OF THE INVENTION

Polymerization of the monomer used in the invention is generally conducted in two stages, the first or prepolymerization stage being carried out in bulk and the second stage being carried out either in bulk or aqueous suspension. The prepolymerization is preferably thermally initiated by heating the polymerization mixture to a temperature of about 80° to 130° C., most preferably at a temperature of about 90–120° C. The polymerization mixture is maintained at a temperature within that range until the end of the first stage. The mercaptan molecular weight modifying agent is added to the polymerization mixture during the first stage but addition of the mercaptan is delayed until about 2 to about 15% of the monomer has been polymerized. The first stage heating cycle preferably consists of a heating period of from about 7 to about 15 hours at a temperature of about 80° to about 120° C. and can be terminated at any point after about 20% of the monomer has been converted to polymer. The optimum first stage termination point will depend upon the properties desired in the finished product. These, in turn, are influenced by such variables as the percentage of rubbery polymer in the reaction mixture and the operating conditions, such as temperature, catalyst concentration, etc. In general it has been found that the first stage is ideally terminated after about 20 to about 50% of the monomer has been converted to polymer with the preferred termination point being after at least 25% conversion has occurred. During the first stage the reactants are stirred sufficiently to maintain a uniform temperature throughout the polymerization mixture.

The second stage polymerization may be conducted either in bulk or in aqueous suspension, the latter being the preferred method. In the preferred embodiment the prepolymerization product is suspended in an aqueous solution containing a suspending agent and any other desired polymerization aids, such as catalysts, etc. The polymerization is continued during the second stage by heating the stirred suspension to a temperature of about 50° to 150° C. and maintaining it at that temperature until polymerization is substantially complete.

In the modification in which the second stage polymerization is carried out in bulk, the polymerization is continued, after completion of the first stage, at a temperature of about 90° to 200° C. until substantially all of the monomeric component is polymerized. This can be accomplished in a sealed vessel with or without stirring since the heat of polymerization can be more easily controlled during this phase of the polymerization. In this modification the temperature is progressively increased during the second stage of the polymerization to maintain the mass in a fluid condition. Bulk polymerization of the second stage reaction mixture may also be carried out by continuously passing the polymerizing mass through one or more heated zones which maintain it at the polymerization temperature for a period of time sufficient to substantially polymerize the remaining monomer. Volatile components in the polymerization product may be removed by heating at atmospheric or subatmospheric pressure.

Typical of the 1,3-butadiene rubbery polymers usable in the invention are the rubbery homopolymers and copolymers of 1,3-butadiene such as butadiene-styrene, butadiene-acrylonitrile, or butadiene-methacrylonitrile copolymers and terpolymers such as butadiene-styrene-acrylonitrile, or butadiene-styrene-methacrylonitrile terpolymers. The presently preferred 1,3-butadiene rubbery polymers are SBR, a copolymer containing about 75% butadiene and 25% styrene, and polybutadiene homopolymer having a cis-1,4 content of at least 95%. The amount of 1,3-butadiene rubbery polymer used to prepare the products of the invention is about 3 to 30%, preferably about 5 to 15%, based on the total weight of monomeric and rubbery components present in the polymerization mixture.

The monovinyl aromatic compounds which may be used include styrene, alpha-methylstyrene, vinylnaphthalene, and derivatives thereof that are free from nuclear substituents which interfere with the production of the desired impact vinyl aromatic polymers of this invention. Specific examples of derivatives of such monovinyl aromatic compounds include para-methylstyrene, meta-methylstyrene, para-ethylstyrene, para-isopropylstyrene, ortho-chloro-styrene, para-chlorostyrene, aryl-dimethylstyrene, aryl-dichlorostyrene, para-fluorostyrene, para-bromostyrene, and aryl-methyl-aryl-isopropylstyrene. The preferred vinyl aromatic compound is styrene.

Minor amounts, e.g., up to about 5%, of other polymerizable vinyl substances may be present in the reaction mixture provided they do not adversely affect the polymerization reaction or prevent the attainment of the desired polymer. Examples of such substances are acrylic, methacrylic and itaconic acid esters, e.g., ethylacrylate, methyl-methacrylate, dimethyl-itaconate, etc. Examples of other vinyl compounds which may be present are acrylonitrile, vinyl chloride, vinylidene chloride, etc.

The mercaptans useable in the invention are those which are soluble in the monomer used and which have molecular weight modifying activity. These compounds have the formula RSH, where R can be an alkyl radical having up to about 24 carbon atoms or an aryl having about 6 to 24 carbon atoms, the other mercaptans being less desirable because of their disagreeable odor. Particularly good results are obtained with dodecyl mercaptan. The amount of mercaptan which can be advantageously used in the invention varies from about 0.005 to 0.5%, the preferred amount being about 0.05 to 0.25%, based on the total weight of monomer and polymer. It has been found that the size and configuration of the suspended rubbery particles is greatly influenced by the time of addition of the mercaptan to the polymerizing mixture. By virtue of this invention it is now possible to consistently prepare impact vinyl aromatic polymers having any desired average rubbery polymer particle size, even less than about 10 microns, and particularly about 1 to 10 microns. As mentioned above, the mercaptan is added to the polymerizing mass after about 2 to about 15% of the monomer has been converted to polymer. It has been found that the best results are obtained when the mercaptan is added after about 3 to 12% of the monomer has been polymerized. The effective time of addition within the invention as well as the optimum time of addition of the mercaptan depends on several variables, including the type and concentration of rubbery polymer added, the particular monomers being used and their relative proportions, the polymerization temperature employed, the catalyst concentration, etc. All of the mercaptan may be added in the time specified above or, if desired, some of the mercaptan can be added at later times during the first or second stage polymerization. In the event at least 0.005%, based on the total weight of monomer and rubbery polymers present, must be added in the period after about 2 to 15% of the monomer has been polymerized. When additional mercaptan is added after the first stage has been completed and the second stage is by suspension polymerization, it is preferably added before the suspension polymerization is initiated.

When the second stage is conducted by suspension polymerization methods, any of the usual suspending agents, such as polyvinyl alcohol, hydroxyethyl cellulose, ammonium polyacrylate, hydroxy-apatite, bentonite, and the like, may be used alone or in combination. Anionic surface active agents may also be used. Suitable anionic surface active agents include fatty acid surfactants, aromatic carboxylic acid surfactants, aromatic and aliphatic organic sulfates and sulfonates, such as sodium and potassium beta-naphthalene sulfonates, sodium and potassium dodecylbenzene sulfonates, sodium and potassium stearates, sodium and potassium caprolates, sodium and potassium lauryl sulfates, and the like. Any effective small amount of the suspending agents and anionic surfactants may be used, ordinarily about 0.002 to about 0.06% of anionic surfactant, based on the weight of the water in the polymerization mixture, is sufficient.

At least one free-radical catalyst is used in the suspension stage of the polymerization process. The preferred catalysts are monomer soluble and have decomposition ranges suitable for the temperature of the suspension stage. Peroxide catalysts have been found to be particularly suitable. Several classes of peroxide catalysts may be used, such as benzoyl peroxide, chlorobenzoyl peroxide, bromobenzoyl peroxide, fluorobenzoyl peroxide, naphthal peroxide, lauroyl peroxide, myristyl peroxide, stearyl peroxide, di-tertiary-butyl peroxide, hydrogen peroxide, decanoyl peroxide, para-methane hydroperoxide, tertiary-butyl peroctoate and the like or combinations thereof. Also, suitable azo catalysts may be used, either alone or in combination with other catalysts. A suitable azo catalyst is ozo-bisisobutyronitrile. Any effective amount of catalyst or combination of catalysts may be used; ordinarily from about 0.05 to about 1.5% by weight, based on the total weight of the monomer and rubbery polymer charged, of catalytic agent is satisfactory.

The invention is further illustrated by the following examples in which parts are by weight, based on the total weight of monomer and rubbery polymer charged. In determining the Izod impact and tensile strengths of the samples prepared in the examples the procedures of ASTM-D-256-56T and ASTM-D-638-64T respectively, are followed. In determining the melt index the procedure of ASTM-D-1238-65T, condition H, is followed.

EXAMPLE I

Run No. 1

A dissolving tank is charged with a mixture of about 9 parts of a polybutadiene rubber having about 98% of its units in the cis-1,4-configuration; about 91 parts of styrene; about 0.25 part of lubricant; about 0.15 part of antioxidant and about 0.085 part dodecyl mercaptan and the mixture is heated to about 100° C. and held at that temperature for a sufficient period of time to substantially completely dissolve the rubber. The mixture is then filtered to remove insoluble matter and charged into an agitator-equipped polymerization reactor which has been swept with nitrogen. The temperature in the polymerization reactor is raised to about 105° C. and held at that temperature for about 9 hours, after which the charge is cooled to approximately 70° C. and dumped into a second polymerization reactor equipped with an agitator and containing about 53 parts of water, 0.25 part electrolyte, 0.20 part suspending agent and about 2 parts plasticizer. The pH of the aqueous solution is adjusted to about 3 and the mixture is agitated sufficiently to establish and maintain a suspension. A peroxide catalyst (0.12 part) is added to the mixture, the reactor is pressurized with nitrogen to about 20 lbs. p.s.i.g. and the charge is heated to about 110° C. and held at that temperature for about 5 hours. The charge is then cooled and the reaction product, consisting of small uniform spherical beads of impact polystyrene, is separated from the aqueous suspension, washed and dried. Specimens suitable for physical testing and microscopic examination are prepared from the beads. The results of these evaluations are reported in Table I.

Run No. 2

A second impact polystyrene sample is prepared in accordance with the procedure of Run No. 1 except that the dodecyl mercaptan is added when about 5½% of the styrene is polymerized. Samples are prepared and evaluated for physical properties and the results are reported in Table I.

Run No. 3

A third impact polystyrene is prepared in accordance with the procedure of Run No. 1 except that the dodecyl mercaptan is added when about 7% of the styrene is polymerized. Samples are prepared for physical testing and the results are reported in Table I.

TABLE I

| | Izod impact strength [1] | Melt index [2] | Tensile strength at yield, p.s.i.g. | Rubbery polymer particle size, microns |
|---|---|---|---|---|
| Run No.: | | | | |
| 1 | 1.84 | 1.23 | 2,663 | 10–50 |
| 2 | 2.83 | 1.26 | 3,230 | 1–5 |
| 3 | 2.78 | 1.29 | 3,240 | 1–5 |

[1] Ft.-lbs. per inch of notch.
[2] Grams extruded in 10 minutes.

Example I shows that the impact and tensile strengths of impact polymers prepared in accordance with the present invention are significantly higher than those of polymers prepared by a conventional method, i.e., a process in which the mercaptan molecular weight regulating agent is added at the outset of, instead of during the early stages of, the polymerization. The surface appearance of the Run No. 2 and 3 polymers is much smoother than the surface appearance of the Run No. 1 sample; this improvement is attributed to the smaller particle size of the rubbery polymer in the Run Nos. 2 and 3 polymers compared to the particle size of the Run No. 1 polymer.

This example demonstrates that the appearance and toughness of impact polystyrenes prepared in accordance with the present invention are significantly improved without sacrificing the desirably high flow properties of the polymers. Furthermore, this example demonstrates that the present invention provides a method for easily regulating the particle size of impact vinyl aromatic polymers.

EXAMPLE II

Run No. 1

An impact polystyrene is prepared in accordance with the procedure of Run No. 1 of Example I except that only 5 parts of rubbery component is used and no lubricant is added to the reaction mixture. Samples are prepared for physical testing and the results are reported in Table II.

Run No. 2

A portion of the product of Run No. 1 of Example I is blended with crystalline polystyrene in an amount sufficient to reduce the rubber concentration to about 4.9 parts, based on the total weight of polymer. Samples are prepared for physical testing and the results are reported in Table II.

Run No. 3

A portion of the polymeric product of Run No. 2 of Example I is blended with crystalline polystyrene in an amount sufficient to reduce the rubber concentration to about 4.9 parts, based on the total weight of polymer. Samples are prepared for physical testing and the results are reported in Table II.

Run No. 4

A portion of the polymeric product of Run No. 3 of Example I is blended with crystalline polystyrene in an amount sufficient to reduce the rubber concentration to about 4.9 parts, based on the total weight of polymer.

Samples are prepared for physical testing and the results are reported in Table II.

TABLE II

| Run No.: | Percentage rubbery polymer in product | Izod impact strength, ft.-lbs. per inch of notch |
|---|---|---|
| 1 | 5.0 | 1.54 |
| 2 | 4.9 | 1.05 |
| 3 | 4.9 | 1.66 |
| 4 | 4.9 | 1.65 |

Run No. 1 of Example II is carried out in accordance with conventional polymerization practice, i.e., the mercaptan chain regulating agent is added to the polymerization reaction mixture prior to initiation. In this run the rubber content of the product is 5%. Run No. 2 is carried out according to the Run No. 1 procedure except that the rubber content of the product is about 9%. This product is blended with sufficient styrene homopolymer to yield a product containing about 4.9% rubber. Table II shows that when the Run No. 2 procedure is followed the resulting product has a much lower impact strength than the directly polymerized 5% rubber containing product. Run Nos. 3 and 4 are carried out in accordance with the present invention and the polymerization product contains about 9% rubber. The products of Run Nos. 3 and 4 are blended with sufficient amounts of styrene homopolymer to yield impact polystyrenes containing about 4.9% rubber. Table II shows that the impact strengths of these polymers are very much higher than that of the Run No. 2 product and are even higher than the Run No. 1 product impact strength.

Example II demonstrates that an impact vinyl aromatic polymer of any desired rubber content can be prepared by blending a given impact vinyl aromatic polymer having a higher rubber content with the corresponding resinous homopolymer contained in the impact polymer without losing any of the effectiveness of the rubber as a toughener if the higher rubber containing polymer is prepared in accordance with the present invention. Thus, by virtue of the present invention, impact vinyl aromatic polymers having any desired impact strength can now be easily prepared from one high impact vinyl aromatic polymer.

Although the invention has been described by reference to specific examples, it is understood that its breadth is not limited thereto, but is only limited by the scope of the appended claims.

What is claimed is:

1. A process for preparing impact vinyl aromatic polymers having improved physical properties comprising:
    (a) mass polymerizing a mixture containing at least one monomeric mono-vinyl aromatic compound and at least one 1,3-butadiene rubbery polymer;
    (b) adding 0.005 to 0.5%, based on the combined weight of monomer and rubbery components in the mixture, of a mercaptan molecular weight regulating agent to the polymerization mixture during the polymerization, at least 0.005% of which is added when about 2 to 15% by weight of the monomer has been converted to polymer and the remainder is subsequently added in one or more increments; and
    (c) continuing the mass polymerization until substantially all of the monomer has been polymerized.

2. A process according to claim 1 wherein substantially all of the mercaptan molecular weight regulating agent is added to the polymerization mixture when about 2 to 15% by weight of the monomer has been converted to polymer.

3. A process according to claim 1 wherein the molecular weight regulating agent is an alkyl mercaptan containing 1–24 carbon atoms and it is added to the polymerization mixture when about 3 to 12% by weight of the monomer has been converted to polymer.

4. A process according to claim 1 wherein the mass polymerization is carried out in two stages, the first stage polymerization being carried out thermally at a temperature of about 90 to 120° C. and the second stage being conducted at a temperature of about 90 to 200° C.

5. A process according to claim 1 wherein the mercaptan molecular weight regulating agent is an alkyl mercaptan having 8 to 14 carbon atoms and the total amount added to the polymerization mixture is about 0.05 to 0.25%.

6. A process according to claim 5 wherein the vinyl aromatic monomer is styrene and the 1,3-butadiene rubbery polymer is selected from the group consisting of polybutadiene having at least 95% of the butadiene units present in the cis-1,4 configuration and styrene-butadiene copolymer containing about 25% styrene and 75% butadiene.

7. A process for preparing impact vinyl aromatic polymers having improper physical properties comprising:
    (a) mass prepolymerizing a mixture containing at least one monomeric mono-vinyl aromatic compound and at least one 1,3-butadiene rubbery polymer;
    (b) adding 0.005 to 0.5%, based on the combined weight of monomer and rubbery components in the mixture, of an alkyl or aryl mercaptan having 6 to 24 carbon atoms to the polymerization mixture during the polymerization, at least 0.005% of which is added when about 2 to 15% by weight of the monomer has been converted to polymer and the remainder is subsequently added in one or more increments;
    (c) continuing the mass prepolymerization until about 20 to about 50% of the monomer has been converted to polymer;
    (d) suspending the resulting prepolymerization mixture in an aqueous solution containing a suspending agent; and
    (e) polymerizing the mixture at a temperature of about 50 to about 150° C. until substantially all of the monomer has been polymerized.

8. A process according to claim 7 wherein the monomeric mono-vinyl aromatic compound is styrene and the 1,3-butadiene rubbery polymer is selected from the group consisting of polybutadiene having at least 95% of its units in the cis-1,4 configuration and styrene butadiene copolymer containing about 25% styrene and 75% butadiene.

9. A process according to claim 7 wherein the mass prepolymerization is continued until at least 25% of the monomers have been converted to polymer.

10. A process according to claim 7 wherein all of the mercaptan is added to the prepolymerization mixture when about 2 to 15%, by weight of the monomer has been converted to polymer.

11. A process according to claim 10 wherein the mercaptan is an alkyl mercaptan containing 8 to 24 carbon atoms and it is added to the polymerization mixture when about 3 to 12% by weight of the monomer has been converted to polymer.

12. A process according to claim 10 wherein the total amount of mercaptan added to the polymerization mixture is about 0.05 to 0.25%.

13. A process according to claim 7 wherein about 0.05 to 1.5%, based on the total weight of the monomeric and rubbery polymer components, of a polymerization catalyst is added to the aqueous suspension.

14. A process according to claim 12 wherein the 1,3-butadiene rubbery polymer is present in an amount of about 5 to 30% based on the total weight of monomeric and rubbery polymer components.

15. Process according to claim 14 wherein the monomeric mono-vinyl aromatic compound is styrene and the 1,3-butadiene rubbery polymer is present in an amount of about 5 to 15%, based on the total weight of monomeric and rubbery polymer components.

16. A process according to claim 15 wherein the 1,3-butadiene rubbery polymer is a polybutadiene having at least 95% of its units in the cis-1,4 configuration.

17. A process for producing impact polystyrene polymer having improper physical properties the rubbery polymer component of which is uniformly dispersed throughout the polymeric composition and which has a particle size of about 1 to 10 microns comprising:
  (a) dissolving at least one 1,3-butadiene rubbery polymer in styrene monomer;
  (b) prepolymerizing the rubbery polymer-monomer solution by mass polymerization until about 25 to about 50% by weight of the monomer has been converted to polymer;
  (c) adding to the polymerizing mixture, when about 2 to 15% of the monomer has been polymerized, about 0.05 to about 0.25%, based on the total weight of monomer and rubbery polymer present in the mixture of alkyl mercaptan having 1 to 24 carbon atoms;
  (d) dispersing the prepolymer mixture in an aqueous solution containing a suspending agent; and
  (e) polymerizing the suspended prepolymer mixture until substantially all of the monomer has been polymerized.

18. A process according to claim 15 wherein the mercaptan is added to the polymerizing mixture when about 3 to 12% by weight of the monomer has been polymerized.

19. A process for preparing an impact vinyl aromatic polymer having improved physical properties comprising:
  (a) dissolving at least one 1,3-butadiene rubbery polymer in at least one vinyl aromatic monomer;
  (b) prepolymerizing the rubbery polymer-monomer solution by mass polymerization until about 25 to about 50% by weight of the monomer has been converted to polymer;
  (c) adding to the polymerizing mixture, when about 2 to 15% of the monomer has been polymerized, about 0.005 to about 0.50%, based on the total weight of monomer and rubbery polymer present in the mixture of alkyl mercaptan having 1 to 24 carbon atoms;
  (d) dispersing the prepolymer mixture in an aqueous solution containing a suspending agent;
  (e) polymerizing the suspended prepolymer mixture until substantially all of the monomer has been polymerized; and
  (f) blending the polymerized impact vinyl aromatic polymer with homopolymer prepared from said vinyl aromatic monomer.

References Cited
UNITED STATES PATENTS
3,428,712  2/1969  Corrock et al. _____ 260—880

JOSEPH L. SCHOFER, Primary Examiner
W. F. HAMROCK, Assistant Examiner

U.S. Cl. X.R.
260—879, 880

PO-1050
(5/69)

UNITED STATES PATENT OFFICE
CERTIFICATE OF CORRECTION

Patent No. 3,781,383  Dated December 25, 1973

Inventor(s) Arnold B. Finestone, and Richard C. Westphal, and Charles Brac,

It is certified that error appears in the above-identified patent and that said Letters Patent are hereby corrected as shown below:

Column 2, line 30, change "time addition" to read "time of addition".

Column 3, line 35, change "after at least 25%" to read "after at least about 25%".

Column 4, line 62, change "In the event" to read "In any event".

Column 5, line 26, change "ozo" to "azo".

Column 8, line 17, change "improper" to "improved".

Column 9, line 2, change "improper" to "improved".

Signed and sealed this 30th day of April 1974.

(SEAL)
Attest:

EDWARD M. FLETCHER, JR.
Attesting Officer

C. MARSHALL DANN
Commissioner of Patents